(12) United States Patent
Kenchammana-Hosekote et al.

(10) Patent No.: US 12,299,052 B2
(45) Date of Patent: May 13, 2025

(54) EXTENSIBLE AND ELASTIC DATA MANAGEMENT SERVICES ENGINE EXTERNAL TO A STORAGE DOMAIN

(71) Applicant: NetApp Inc., San Jose, CA (US)

(72) Inventors: Deepak Raghu Kenchammana-Hosekote, Mountain View, CA (US); Shiva Chaitanya, Watertown, MA (US); Saeed Ghanbari, New Haven, CT (US); Barry Patrick Benight, San Jose, CA (US); David Anthony Slik, Northridge, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/357,277

(22) Filed: Jul. 24, 2023

(65) Prior Publication Data
US 2024/0126820 A1     Apr. 18, 2024

Related U.S. Application Data

(63) Continuation of application No. 17/013,712, filed on Sep. 7, 2020, now Pat. No. 11,709,897, which is a
(Continued)

(51) Int. Cl.
*G06F 16/93*     (2019.01)
*G06F 16/10*     (2019.01)
(Continued)

(52) U.S. Cl.
CPC ............. *G06F 16/93* (2019.01); *G06F 16/10* (2019.01); *G06F 16/20* (2019.01);
(Continued)

(58) Field of Classification Search
CPC .......... G06F 16/93; G06F 16/20; G06F 16/10; H04L 67/63; H04L 67/1097; H04L 67/142
See application file for complete search history.

(56) References Cited

U.S. PATENT DOCUMENTS 6,308,216 B1    10/2001  Goldszmidt et al.
6,449,280 B1 *   9/2002  Christie ............... H04Q 3/0016
                                              370/399
(Continued)

OTHER PUBLICATIONS

Final Office Action cited in U.S. Appl. No. 16/375,942, mailed Jun. 16, 2021, 14 pages.
(Continued)

*Primary Examiner* — Mark E Hershley
(74) *Attorney, Agent, or Firm* — Cooper Legal Group, LLC

(57) ABSTRACT

A data management services architecture includes architectural components that run in both a storage and compute domains. The architectural components redirect storage requests from the storage domain to the compute domain, manage resources allocated from the compute domain, ensure compliance with a policy that governs resource consumption, deploy program code for data management services, dispatch service requests to deployed services, and monitor deployed services. The architectural components also include a service map to locate program code for data management services, and service instance information for monitoring deployed services and dispatching requests to deployed services. Since deployed services can be stateless or stateful, the services architecture also includes state data for the stateful services, with supporting resources that can expand or contract based on policy and/or service demand. The architectural components also include containers for the deployed services.

20 Claims, 6 Drawing Sheets

Related U.S. Application Data continuation of application No. 14/815,470, filed on Jul. 31, 2015, now Pat. No. 10,769,212.

(51) Int. Cl.
  *G06F 16/20* (2019.01)
  *H04L 67/1097* (2022.01)
  *H04L 67/142* (2022.01)
  *H04L 67/63* (2022.01)

(52) U.S. Cl.
  CPC ........ *H04L 67/1097* (2013.01); *H04L 67/142* (2013.01); *H04L 67/63* (2022.05)

(56) References Cited

U.S. PATENT DOCUMENTS

| | | | | |
|---|---|---|---|---|
| 7,016,966 | B1* | 3/2006 | Saulpaugh | H04L 67/10 709/230 |
| 7,085,362 | B1* | 8/2006 | Christie | H04L 49/255 379/207.02 |
| 7,100,195 | B1* | 8/2006 | Underwood | H04L 63/0823 707/999.009 |
| 7,289,964 | B1* | 10/2007 | Bowman-Amuah | G06F 9/5038 705/1.1 |
| 7,437,614 | B2* | 10/2008 | Haswell | G06F 11/3684 714/E11.208 |
| 8,023,425 | B2* | 9/2011 | Raleigh | H04W 12/02 370/252 |
| 8,261,295 | B1* | 9/2012 | Risbood | H04L 41/5012 717/177 |
| 8,346,929 | B1* | 1/2013 | Lai | H04L 67/51 709/226 |
| 8,800,020 | B1* | 8/2014 | Dale | H04L 63/08 726/10 |
| 8,862,675 | B1* | 10/2014 | Coomer | H04L 51/212 709/224 |
| 8,918,761 | B1* | 12/2014 | Whitcomb | G06F 9/505 709/224 |
| 9,351,193 | B2* | 5/2016 | Raleigh | G06Q 30/0207 |
| 9,569,459 | B1* | 2/2017 | Strauss | G06F 16/182 |
| 9,817,703 | B1 | 11/2017 | Ryland et al. | |
| 9,853,898 | B1* | 12/2017 | Subramanian | H04L 45/42 |
| 10,467,423 | B1 | 11/2019 | McClintock et al. | |
| 10,530,757 | B2* | 1/2020 | Seed | H04W 76/10 |
| 10,644,950 | B2* | 5/2020 | Hu | H04L 41/0894 |
| 10,769,212 | B2 | 9/2020 | Kenchammana-Hosekote et al. | |
| 11,232,160 | B2 | 1/2022 | Kenchammana-Hosekote et al. | |
| 2002/0002622 | A1* | 1/2002 | Vange | H04L 67/1008 709/227 |
| 2003/0058277 | A1* | 3/2003 | Bowman-Amuah | G06F 16/289 715/765 |
| 2004/0204949 | A1* | 10/2004 | Shaji | G06F 11/1469 714/E11.122 |
| 2005/0021713 | A1* | 1/2005 | Dugan | H04Q 3/0029 709/246 |
| 2005/0044197 | A1* | 2/2005 | Lai | H04L 67/02 709/223 |
| 2005/0240592 | A1* | 10/2005 | Mamou | G06Q 10/10 707/999.009 |
| 2005/0262192 | A1* | 11/2005 | Mamou | G06Q 10/10 709/203 |
| 2006/0031340 | A1* | 2/2006 | Mathew | H04L 51/214 707/999.2 |
| 2006/0100912 | A1* | 5/2006 | Kumar | G06F 16/951 705/4 |
| 2006/0209695 | A1* | 9/2006 | Archer, Jr. | G06F 9/505 370/235 |
| 2007/0110043 | A1* | 5/2007 | Girard | H04M 7/006 370/352 |
| 2008/0043969 | A1 | 2/2008 | Shi | |
| 2008/0162637 | A1* | 7/2008 | Adamczyk | H04L 51/043 709/204 |
| 2009/0254971 | A1* | 10/2009 | Herz | G06Q 10/10 726/1 |
| 2009/0276771 | A1* | 11/2009 | Nickolov | G06Q 30/04 718/1 |
| 2009/0282471 | A1* | 11/2009 | Green | H04L 63/0281 726/14 |
| 2010/0192212 | A1* | 7/2010 | Raleigh | H04W 24/08 726/7 |
| 2010/0268836 | A1* | 10/2010 | Jabri | H04L 65/765 709/231 |
| 2010/0332456 | A1* | 12/2010 | Prahlad | G06F 16/1827 713/160 |
| 2011/0126207 | A1* | 5/2011 | Wipfel | G06F 9/45533 718/104 |
| 2011/0295645 | A1* | 12/2011 | Barros | G06Q 10/06316 709/227 |
| 2011/0295646 | A1* | 12/2011 | Barros | G06Q 10/06316 705/7.26 |
| 2012/0069131 | A1* | 3/2012 | Abelow | G06Q 30/0601 345/589 |
| 2012/0072578 | A1* | 3/2012 | Alam | G06F 11/3495 709/224 |
| 2012/0158872 | A1* | 6/2012 | McNamee | H04L 69/40 709/206 |
| 2012/0173759 | A1* | 7/2012 | Agarwal | H04L 67/564 709/241 |
| 2012/0215911 | A1* | 8/2012 | Raleigh | H04L 41/5019 709/224 |
| 2012/0246325 | A1* | 9/2012 | Pancorbo Marcos | H04L 43/00 709/227 |
| 2013/0019018 | A1* | 1/2013 | Rice | H04L 67/51 709/226 |
| 2013/0019282 | A1 | 1/2013 | Rice et al. | |
| 2013/0019283 | A1 | 1/2013 | Rice et al. | |
| 2013/0036091 | A1* | 2/2013 | Provenzano | G06F 3/0619 707/624 |
| 2013/0054684 | A1 | 2/2013 | Brazier et al. | |
| 2013/0067468 | A1* | 3/2013 | Tillier | G06F 9/45541 718/1 |
| 2013/0132854 | A1* | 5/2013 | Raleigh | G06F 3/0482 715/738 |
| 2013/0304349 | A1* | 11/2013 | Davidson | G08G 1/202 701/99 |
| 2014/0094159 | A1* | 4/2014 | Raleigh | H04W 24/02 455/418 |
| 2014/0098671 | A1* | 4/2014 | Raleigh | H04M 15/58 370/235 |
| 2014/0120961 | A1* | 5/2014 | Buck | G06F 1/329 455/466 |
| 2014/0136809 | A1* | 5/2014 | Engle | G06F 12/02 711/170 |
| 2014/0140213 | A1* | 5/2014 | Raleigh | H04L 47/806 370/235 |
| 2014/0173045 | A1* | 6/2014 | Crowder | H04L 61/2503 709/219 |
| 2014/0173052 | A1* | 6/2014 | Newton | H04L 67/10 709/219 |
| 2014/0250166 | A1 | 9/2014 | Desai | |
| 2014/0282586 | A1* | 9/2014 | Shear | G06F 9/5072 718/104 |
| 2014/0301388 | A1* | 10/2014 | Jagadish | H04L 67/563 370/389 |
| 2014/0344216 | A1* | 11/2014 | Abercrombie | G06F 16/137 707/609 |
| 2014/0344401 | A1* | 11/2014 | Varney | H04L 41/0803 709/217 |
| 2014/0355484 | A1* | 12/2014 | Foster | H04W 24/02 370/255 |
| 2015/0033311 | A1* | 1/2015 | Seed | H04L 67/14 726/7 |
| 2015/0095917 | A1* | 4/2015 | Challenger | G06F 9/5027 718/104 |
| 2015/0100943 | A1* | 4/2015 | Gabel | G06F 40/20 717/106 |

(56) References Cited

U.S. PATENT DOCUMENTS

| | | | |
|---|---|---|---|
| 2015/0143064 A1* | 5/2015 | Bhargava | G06F 11/1451 711/162 |
| 2015/0186845 A1* | 7/2015 | Dale | H04L 9/3215 709/206 |
| 2015/0248795 A1* | 9/2015 | Davidson | G01C 21/34 701/1 |
| 2015/0341428 A1* | 11/2015 | Chauhan | H04L 63/0209 709/203 |
| 2015/0363282 A1* | 12/2015 | Rangasamy | G06F 11/2033 714/4.12 |
| 2016/0034305 A1* | 2/2016 | Shear | G06F 16/285 707/722 |
| 2016/0078342 A1* | 3/2016 | Tang | H04L 41/00 706/47 |
| 2016/0078361 A1* | 3/2016 | Brueckner | H04L 67/10 706/12 |
| 2016/0132310 A1* | 5/2016 | Koushik | G06F 8/61 717/176 |
| 2016/0255016 A1* | 9/2016 | Miller | H04L 47/805 709/217 |
| 2017/0031955 A1* | 2/2017 | Kenchammana-Hosekote | H04L 67/1097 |
| 2018/0046687 A1* | 2/2018 | Slik | G06F 16/1752 |
| 2019/0238640 A1 | 8/2019 | Kenchammana-Hosekote et al. | |
| 2020/0401632 A1 | 12/2020 | Kenchammana-Hosekote et al. | |

OTHER PUBLICATIONS

Final Office Action cited in U.S. Appl. No. 16/375,929, mailed Aug. 3, 2021, 15 pages.

Non-Final Office Action cited in U.S. Appl. No. 16/375,942, mailed Mar. 4, 2021, 23 pages.

Non-Final Office Action cited in U.S. Appl. No. 16/375,929, mailed Dec. 24, 2020, 23 pages.

Notice of Allowance cited in U.S. Appl. No. 16/375,942, mailed Sep. 9, 2021, 11 pages.

* cited by examiner

EXTENSIBLE AND ELASTIC DATA MANAGEMENT SERVICES ENGINE EXTERNAL TO A STORAGE DOMAIN

RELATED APPLICATIONS

This application claims priority to and is a continuation of U.S. application Ser. No. 17/013,712, filed on Sep. 7, 2020, titled "EXTENSIBLE AND ELASTIC DATA MANAGEMENT SERVICES ENGINE EXTERNAL TO A STORAGE DOMAIN," which claims priority to and is a continuation of U.S. Pat. No. 10,769,212, filed on Jul. 31, 2015, titled "EXTENSIBLE AND ELASTIC DATA MANAGEMENT SERVICES ENGINE EXTERNAL TO A STORAGE DOMAIN," which are incorporated herein by reference.

BACKGROUND

The disclosure generally relates to the field of digital processing, and more particularly to managing resources across a computing environment.

An enterprise level data center or storage system can be logically separated into a storage front end and a storage back end. The storage front end includes devices that are exposed to clients of the storage system. The storage front end devices may be referred to as storage controllers, servers, or filers. The storage back end includes devices that host data and serve data to the storage front end. The storage back end devices may be referred to as storage arrays, storage devices, attached storage, or networked storage.

An organization with a storage system configured for archival or cold storage purposes will have high storage density in the storage back end and have minimal computational resources (e.g., processing capacity and memory) in the storage front end. The minimal computational resources will often be devoted to reliability and space management.

SUMMARY

A data management services architecture includes architectural components that run in both a storage and compute domains. The architectural components redirect storage requests from the storage domain to the compute domain, manage resources allocated from the compute domain, ensure compliance with a policy that governs resource consumption, deploy program code for data management services, dispatch service requests to deployed services, and monitor deployed services. The architectural components also include a service map to locate program code for data management services, and service instance information for monitoring deployed services and dispatching requests to deployed services. Since deployed services can be stateless or stateful, the services architecture also includes state data for the stateful services, with supporting resources that can expand or contract based on policy and/or service demand. The architectural components also include containers for the deployed services, such as virtual machines.

This summary is a brief summary for the disclosure, and not a comprehensive summary. The purpose of this brief summary is to provide a compact explanation as a preview to the disclosure. This brief summary does not capture the entire disclosure or all embodiments, and should not be used limit claim scope.

BRIEF DESCRIPTION OF THE DRAWINGS

Embodiments of the disclosure may be better understood by referencing the accompanying drawings.

DESCRIPTION

Figure 1:
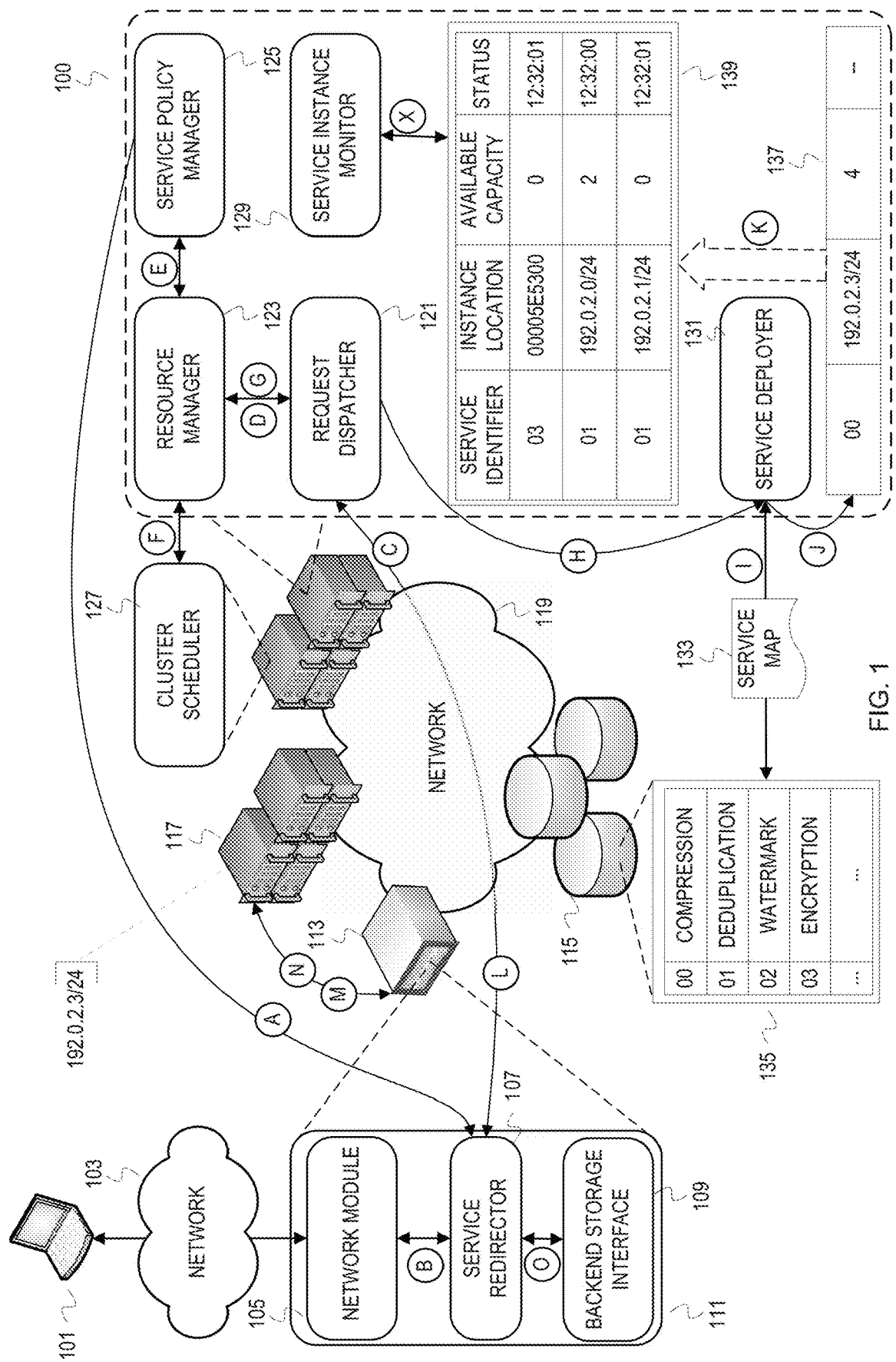
FIG. 1 depicts a conceptual diagram of a data management services architecture providing a data management service for a storage input request.

The description that follows includes example systems, methods, techniques, and program flows that embody embodiments of the disclosure. However, it is understood that this disclosure may be practiced without these specific details. For instance, this disclosure refers to a heartbeat technique for monitoring data management service instances in illustrative examples. But other techniques can be used to monitor status of service instances (e.g., decaying clock, polling, generation of service results, etc.). In other instances, well-known instruction instances, protocols, structures and techniques have not been shown in detail in order not to obfuscate the description.

Introduction

There are a number of different dimensions to data management. A few dimensions of data management include storage efficiency (e.g., deduplication and compression) and security (e.g., encryption). These different dimensions of data management have different resource consumption profiles. Thus, an organization may configure a storage front end device with resources (e.g., memory, processor, type of local storage, etc.) for storage efficiency and not be able to effectively implement encryption. If the demands of the organization shift to a different dimension of data management, then its equipment may not be optimally configured for the different data management dimension. An organization may have customer requirements that fall into different or additional data management dimensions. And the type of data managed by an organization can change. For instance, the data type managed by an organization may change from documents to multimedia.

Overview

A data management services architecture ("services architecture") can be designed that provides data management services to a storage domain of an environment that also includes a compute domain. The data management services correspond to the different dimensions of data management. For instance, a deduplication service and a compression service correspond to the storage efficiency dimension of data management. The environment includes hardware and software that can be logically separated into a storage domain and a compute domain. The storage domain includes devices and software of a storage front end and a storage backend. The compute domain includes other devices and software that are not part of the storage domain. For instance, the compute domain can include a server farm or compute cluster. The compute domain may be a heterogeneous compute domain (e.g., servers in a computer cluster could have varying amounts of random access memory (RAM), could have flash or hard disk drive (HDD) storage, etc.). The two domains can share network resources (e.g., switches, routers, cabling, etc.) and have dedicated network resources. The services architecture provides the storage domain access to services that may have resource consumption profiles that exceed the resources of the storage domain. The services architecture allows the storage domain to be adaptive (e.g., adapt to variations in workload, work type, customer demands, etc.). Providing data management services external to the storage domain avoids an organization designing an environment, in particular the storage domain, for worst case usage and avoids under-utilization of resources. Furthermore, the services architecture isolates the data management services from the storage domain, and isolates the data management services from each other. This isolation prevents exposure of program code that implements a storage management service to loss of control risks that can occur with various software licenses.

The services architecture includes architectural components that run in both the storage and compute domains. The architectural components redirect storage requests from the storage domain to the compute domain ("service redirector"), manage resources allocated from the compute domain ("services resource manager" or "resource manager"), ensure compliance with a policy that governs resource consumption ("policy manager"), deploy program code for data management services ("service deployer"), dispatch service requests to deployed services ("request dispatcher"), and monitor deployed services ("service instance monitor"). The architectural components also include a service map to locate program code for data management services, and service instance information for monitoring deployed services and dispatching requests to deployed services. Since deployed services can be stateless or stateful, the services architecture also includes state data for the stateful services, with supporting resources that can expand or contract based on policy and/or service demand. The architectural components also include containers for the deployed services, for example virtual machines.

Example Illustrations

FIG. 1 depicts a conceptual diagram of a data management services architecture providing a data management service for a storage input request. In FIG. 1, a system includes a storage domain and a compute domain. The storage domain includes a storage front end device 113 and back end storage 115. Additional storage front end devices are not depicted to avoid overcomplicating the figure. Similarly, FIG. 1 uses an abstract icon for the back end storage 115 to avoid overcomplicating the figure. The compute domain includes a computer cluster 117. The compute domain and the storage domain communicate via a network 119. An operating system 111 runs on the storage front end device 113. The operating system 111 hosts a network protocol module ("network module") 105, a service redirector 107, and a backend storage interface 109. In the computer cluster 117, a cluster scheduler 127 manages the resources of the computer cluster 117, which includes allocation of resources. Examples of the resources managed by the cluster scheduler 127 include processing time, processors, processor cores, virtual machines, memory, local storage, etc. A data management services engine 100 also runs in the computer cluster 127. A data management services architecture includes the data management services engine 100 and the service redirector 107 hosted by the operating system 111 on the storage front end device 113.

FIG. 1 is annotated with a series of letters A-M and X. These letters represent stages of operations. Although these stages are ordered for this example, the stages illustrate one example to aid in understanding this disclosure and should not be used to limit the claims. Subject matter falling within the scope of the claims can vary with respect to the order and some of the operations. Stage X is used to identify an operational stage that is ongoing.

At stage A, a service policy manager 125 of the data management service manager 100 supplies a set of one or more service rules to the service redirector 107. A user interface can be used to define policies. These policies indicate rules for when a data management service is to be applied ("service rules"). These policies also indicate rules for resource consumption by the data management services architecture ("consumption rules"). The service policy manager 125 can promulgate the service rules throughout the storage front end or to specified devices. The service policy manager 125 can also update the promulgated service rules. The service policy manager 125 can promulgate the service rules by storing the service rules into the storage domain and notifying service redirectors of the location of the service rules. The service policy manager 125 can also provide the service rules to the known locations in the storage front end (e.g., network addresses and ports) and allow the service redirectors and operating systems to manage storage of the service rules (e.g., in local memory).

At stage B, the service redirector 107 detects an input request from a network module 105. A client device 101 submits an input request (e.g., a write command, a PUT command, UPDATE command, etc.) over a network 103 that is received by the storage front end device 113. The network 103 may have some network components in common with the network 119. The network module 105 processes the input request in accordance with the relevant network protocols that conveyed the input request. The input request typically flows from the network module 105 to eventually arrive at the backend storage interface 109 (e.g., a RAID module, object storage interface, etc.). In this case, the service redirector 107 intercepts the input request to determine whether a data management service is to be applied to the input request. For example, the service redirector 107 can run as a background process in the operating system 111. When the input request is written to a location that is read by the storage back end interface 109, the service redirector 107 fetches the input request for evaluation against installed service rules. If no service is to be applied, then the service redirector writes the input request back to the location to be read by the storage back end interface 109. As another example, the network module 105 calls a function that is exposed as a call to the storage back end interface 109 (or an intermediary module). Instead, the function invokes code of the service redirector 107 for evaluation of the input request against the installed services rules. For this illustration, the service redirector 107 determines that a service is to be applied to the input request in according to the service rules.

At stage C, the service redirector 107 generates and transmits a request for a service instance ("service instance request") to a request dispatcher 121 of the data management services engine 100. The service redirector 107 attaches a service identifier to the service instance request based on evaluation of the service rules. For example, evaluation of the service rules against the input request generated a service identifier. As another example, the input request itself includes a service identifier in metadata of the input request. The request dispatcher 121 has previously been exposed as a defined point for receiving service instance requests.

At stage D, the request dispatcher 121 informs a resource manager 123 of the data management services engine 100 that resources allocated to the services architecture are insufficient for the requested service. In this illustration, the request dispatcher 121 determines that no instance of the requested service is available for the input request and resources are insufficient to deploy the service. The request dispatcher 121 determines a resource consumption profile for the requested service and supplies this information to the resource manager 123.

At stage E, the resource manager 123 interacts with the service policy manager 125 to determine that further allocation of resources for the requested service will not violate a consumption rule of a relevant service policy. The resource manager 123 determines resources to be requested from the cluster scheduler 127. The resource manager 123 may request resources in accordance with the requested service resource consumption profile or may request additional resources, perhaps as a buffer for further services. The resource manager 123 queries the service policy manager 125 with an indication of the resources to be requested. For this illustration, the service policy manager 125 replies to the resource manager 123 that the resource request will not violate a consumption rule of a relevant policy. Relevancy of a policy can vary depending upon how policies are defined. As an example, service policies with different consumption rules may be defined for different departments of an organization.

At stage F, the resource manager 123 interacts with the cluster scheduler 127. The resource manager 123 submits a request for resources to be allocated from the computer cluster 117. The cluster scheduler 127 will fulfill the request or deny the request. In this illustration, the cluster scheduler 127 fulfills the request. In fulfilling the request, the cluster scheduler 127 communicates to the resource manager 123 identifiers of the resources (e.g., network addresses). The cluster scheduler 127 may allocate the requested resources by instantiating virtual machines that have a portion of the processing capacity and memory of an actual physical compute node, for example.

At stage G, the resource manager 123 conveys an identifier(s) of resources to the request dispatcher 121. As mentioned previously, the resource manager 123 may have obtained more resources than needed to support the requested service. In that case, the resource manager 123 will determine which of the obtained resources to convey to the request dispatcher. The resource manager 123 can maintain information that indicates which resources have been consumed for services and which resources are available to support additional services.

At stage H, the request dispatcher 121 requests that a service deployer 131 of the data management services engine 100 deploy the requested service. The request dispatcher 121 indicates to the service deployer 131 the requested service and identifier(s) of the resources provisioned for the requested service.

At stage I, the service deployer 131 deploys the service using a service map 133 and the information from the request dispatcher 121. The service deployer 131 accesses the service map 133 to determine where program code for the requested service is located, as well as attributes of the requested service. In this illustration, a services repository 135 is stored in the storage back end 115. Also, for this example, the requested service is data compression. Thus, the service deployer 131 submits a request to the storage domain for the program code for a particular data compression using the location information from the service map 133. After obtaining the data compression program code, the service deployer 131 deploys the service (i.e., instantiates the program code) to the resource identifier supplied by the request dispatcher 121. With the resource identifier, the request dispatcher 121 installs and runs the data compression program code with the attributes indicated in the service map 133 (e.g., compression ratio).

At stage K, the service deployer 131 updates service state information 139 to indicate the newly deployed service and informs the request dispatcher 121 that the service has been deployed. The service state information 139 indicates services that are currently deployed (i.e., instantiated). The service state information 139, in this example, indicates service identifiers of instantiated services, location of each service instance, capacity of each service instance, and status. As illustrated in FIG. 1, the service state information 139 indicates that an instance of an encryption service is deployed at a resource identified by 00.00.5E.53.00. That encryption service instance has no available capacity for additional encryption service requests. The status for the encryption service instance indicates a time 12:32:01. Status can be indicated with any of a variety of information and maintained with different techniques (e.g., a heartbeat technique). In this example, each service instance updates status with a timestamp periodically to communicate that the service instance is still alive. The service state information 139 also indicates two instances of the deduplication service are running. Each deduplication service instance is running at a different instance location identified by an internet protocol address. The deduplication service instance at 192.0.2.0/24 has capacity for 2 additional deduplication service requests and last updated status at 12:32:00. The deduplication service instance at 192.0.2.1/24 does not have capacity for additional deduplication service requests and last updated status at 12:32:01. The service deployer 131 updates the service state information 139 to indicate an instance of the compression service, with identifier 00, instantiated at 192.0.2.3/24. In addition, the information for the compression service instance indicates that the compression service has capacity for 4 service requests. The service deployer 131 can determine capacity for a service based on the service attributes indicated in the service map 133 and provisioned resources. The service attributes are defined in the service map when the service is registered into the data management services architecture. After updating the service state information 139, the service deployer 131 notifies the request dispatcher 121. The service deployer 131 can send a network message to the request dispatcher as a notification or send an inter-process message depending upon implementation of the service architecture. In some embodiments, the service deployer 131 may not notify the request dispatcher 121. The request dispatcher 121 may periodically examine the service state information 139 to determine when a service is deployed. Alternatively, a process or daemon associated with the service state information 139 can notify the request dispatcher 121 when a change to the service state information 139 is detected.

At stage L, the service dispatcher 121 communicates location of the instantiated compression service to the service redirector 107. The service dispatcher 121 and the service redirector 107 can use a stateful communication protocol that maintains state of requests and responses per session. The service dispatcher 121 and the service redirector 107 can use dispatcher can maintain information about requests and responses in local memory independent of a communication protocol. The service dispatcher 121 communicates address and port 192.0.2.3/24 of the deployed compression service to the service redirector 107.

At stage M, the service redirector 107 indicates the input request to the compression service instance at the location in the computer cluster 117 communicated by the request dispatcher 121. The service redirector 107 can create a service request with the input request or data of the input request as payload. The service redirector 107 can wrap the input request with metadata indicating the service identifier and the address/identifier of the service redirector 107 for return of the result of the compression.

At stage N, the compression service instance provides the input request with compressed data to the storage front end device 113. The compression service instance provides the input request with compressed data to the service redirector 107. In some cases, a service instance can provide a result of a service for an input request to the back end storage interface 109 and for an output response to the network module 105. For these cases, the service redirector 107 would have provided identifiers (e.g., socket identifiers, port number, etc.) for these modules when the service request was generated.

At stage O, the input request flows to the back end storage interface 109 with the compressed data. The storage back end interface 109 can then write the compressed data into the storage back end 115 in accordance with the input request.

At stage X, a service instance monitor 129 monitors deployed services using the service state information 139. The service instance monitor 129 traverses the service state information to determine whether any service instances have failed to update its status in a predefined time window. If status for a service instance is stale, then the service instance monitor 129 can take action to determine whether the service instance has failed or whether the some other issue has prevented the service instance from refreshing its status. The service instance monitor 129 can send a message or establish a session with the service instance using the instance location in the service state information 139. The service instance monitor 129 can notify the service deployer of any service that should be redeployed.

In some cases, a requested service may have a counterpart service. For example, a compression service and a decompression service can be considered counterparts to each other. Similarly, an encryption service and a decryption service are counterparts to each other. For these counterpart services, the services architecture can deploy both services when one is requested. In addition, the services architecture can manage resources to ensure a counterpart service is available. For example, the services architecture can reserve resources and/or prioritize counterpart services over other services in resource allocation. This can ensure that compressed or encrypted data can later be decompressed or decrypted.

Also, the conceptual diagram depicted an example of deploying a service instance for a requested service. The service deployer 131 can also terminate a service instance. The services architecture may be given a command to release resources. This command to release resources can be in response to increased demand by a different domain (e.g., compute domain), enforcement of a policy or rule to release resources that are not being utilized, etc. As an example, a command to release resources can be generated in response to detection of a reduction in workload in the storage domain or during a time period when workload is expected or will fall below a threshold number of input/output operations per second, for instance. After selection of particular service instances, the service deployer 131 can gracefully terminate the selected instances. The services architecture can select service instances for deployment in accordance with a service policy that prioritizes service instances and/or based on input from a user interface. The request dispatcher 121 responds to any subsequent requests for the services being terminated with indications that the services are unavailable. The service deployer 131 waits until a service instance has full available capacity (i.e., the service instance is no longer working on a request), and then terminates the service instance. After termination of the service instance, the service deployer 131 indicates the corresponding resources that were supporting the service instance to the resource manager 123 for return of the resources to the cluster scheduler 127. Although resources allocated for providing services to the storage domain can shrink to an insufficient level (e.g., no resources), the services architecture can continue to operate. The services architecture can be designed to queue or hold service requests until sufficient resources are available, perhaps with a number of service requests threshold or wait time threshold to start denying service requests. The services architecture can also be designed to notify or instruct the redirectors to hold, queue, or delay service requests until a deadline (e.g., maximum number of delayed service requests within a time period, a time period, etc.) occurs.

While FIG. 1 depicted a specific example of a request for an uninstantiated service for an input request, the following flowchart figures provide more general examples of operations of a data management services architecture. For simplicity, the flowchart in FIG. 2 is described as if performed by a service redirector for consistency with FIG. 1.

Figure 2:
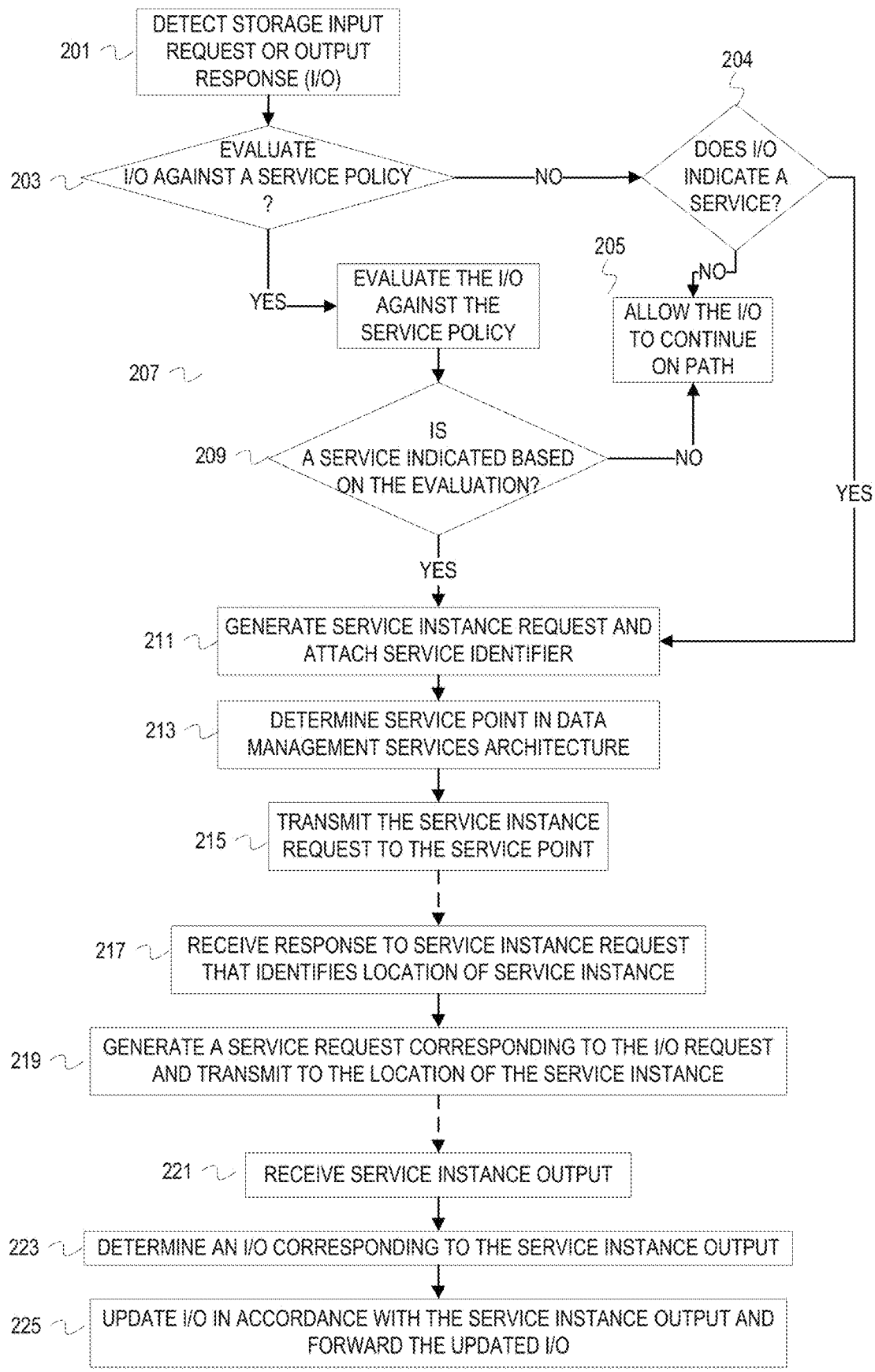
FIG. 2 is a flowchart of example operations for redirecting a storage input request or storage output response to a data management services engine.

FIG. 2 is a flowchart of example operations for redirecting a storage input request or storage output response to a data management services engine ("services engine"). Redirection can be implemented with different techniques. For example, function calls can be modified to invoke redirector program code instead of the expected target. When a network module calls a function to pass an input request to a storage subsystem or storage back end interface, the function call instead invokes the redirector code. Similarly, a function exposed to storage subsystem or storage back end interface can be modified to invoke the redirector code when called to pass an output response out of the storage subsystem or storage back end interface. As another example, a background process or daemon can monitor memory locations and/or call stacks to determine when a storage input request or storage output response is being communicated.

At block 201, a service redirector detects a storage input request (e.g., a write command, PUT request, UPDATE request, etc.) or a storage output response (e.g., a response to a read command or GET request). The service redirector can detect modification of a memory location, modification of a call stack, etc. The service redirector examines the storage input request or storage output response. The storage input request or storage output response will be referred to herein as storage I/O.

At block 203, the service redirector determines whether the I/O should be evaluated against a service policy. Some requests or responses may not be relevant to data management services (e.g., a delete data request). The service redirector can maintain a list of message types that are not relevant to data management services. In some cases, policies may not be defined and evaluated against storage output responses or retrieved data. In addition, the data management services architecture can enter phases or states that suspend service availability. During service suspension state, no storage I/O is evaluated. If the service redirector determines that the storage I/O is not to be evaluated against a policy, then control flows to block 204. Otherwise, control flows to block 207.

At block 204, the redirector determines whether the I/O indicates a service. For a storage input request, metadata of the request can indicate a service. For example, a client application can specify in a header of the request or in header of the data to be written a particular service or services. The service may be specified by a common name that can be recognized by the services architecture or by a previously communicated service identifier. For a storage output response, the retrieved data can be associated with metadata that indicates a service to be applied to the retrieved data. Typically, the service will reverse a transformation of the data that was applied previously (e.g., decompression or decryption). The metadata that indicates the service to be applied to the retrieved data can be associated in different manners. This service indication metadata may travel with the retrieved data (e.g., be written with the data into storage). This metadata may be retrieved in correspondence with retrieval of the data. For example, the metadata can be fetched after determining it is associated with the retrieved data as indicated in file system or storage system metadata. The service to be applied to the retrieved data may have been determined when the data was submitted for storage (i.e., upon ingest). For example, when the redirector determines a service for a storage input request, the redirector can also determine, if relevant, a counterpart service to reverse the transformation the results from application of the service. After determining the counterpart service, the redirector can attach an identifier of the determined counterpart service to the result of the service applied for the storage input request ("ingest service"). Thus, the service identifier can be stored with the transformed input data yielded from the ingest service. The redirector can instead (or also) write the counterpart service identifier into metadata that is separate from the transformed input data but associated with the transformed input data. The storage input request can also specify both an ingest service and the counterpart service. Specifying the counterpart service at ingest helps to ensure service compatibility for data retrieved after services may have changed versions, perhaps years after ingest. Although specifying a counterpart service at ingest can help with service compatibility, embodiments can also determine a counterpart service based on analysis of the retrieved data and/or associated metadata. A redirector or supporting process can analyze retrieved data and/or associated metadata to determine that the retrieved data should be submitted for service transformation. For example, analysis can determine that a particular pattern in the retrieved data corresponds to compression and that the retrieved data is owned by an entity that uses a particular compression technique. If the I/O does not indicate a service, then control flows to block 205. If the I/O indicates a service, then control flows to block 211.

At block 207, the service redirector evaluates the storage I/O against the service policy. The service policy evaluated by the service director is a set of one or more service rules that indicate a condition and a service. If a condition is met, then a service is applied to data of the storage I/O. For example, a service rule may indicate an encryption service if data is to be written into a particular volume or the requestor has a specific requestor identifier (e.g., organizational identifier or device identifier). A service rule may also indicate that a default service be applied unless a different service is specified in the storage request.

At block 209, the service redirector determines whether a service is indicated based on the evaluation of the storage I/O against the service policy. The I/O itself may indicate a requested data management service in metadata. A service from the service policy may override the service indicated in the I/O, if any. Regardless of how the service is indicated, control flows to block 211 if a service is indicated based on the evaluation. If no service is indicated, then control flows to block 205.

At block 205, the service redirector allows the I/O to continue its path. For example, the service redirector allows the I/O to continue to a storage back end interface or a network module.

If a service was indicated, then the service redirector generates a service instance request and attaches a service identifier at block 211. The service redirector can determine the service identifier from the evaluation of the I/O against the service policy.

At block 213, the service redirector determines a service point in the data management services architecture. The service point is a point of submission for a service instance request. The data management service architecture can communicates the identity of the service point(s) when the service policy is communicated to the storage domain. The data management service architecture can publish the identifier (e.g., device identifier, socket identifier, process identifier, etc.) to the storage front end devices. In the context of FIG. 1, the service point is the request dispatcher. A data management services architecture can have multiple service points defined.

At block 215, the service redirector transmits the service instance request to the service point. For instance, the storage director transmits the service instance request to a previously published service point identifier. Although the service redirector can rely on a communication protocol to maintain state of sessions between the storage director and the service point, the service redirector can also maintain data that indicates input requests (e.g., using requestor identifier, session identifier from the input request, etc.) with outstanding service instance requests.

At block 217, the service redirector receives a response from the service point that indicates a location of a service instance. After determining location information for a service instance that can perform the requested service, the service point provides that location information to the service redirector.

At block 219, the service redirector generates a service request corresponding to the I/O request. The service request corresponds to the I/O request because it indicates the service determined for the I/O request after evaluation against the service rules. The service request also indicates, literally or referentially, data to which the service is being applied. After generating the service request, the service redirector transmits the service request to the service instance as identified with the location information (e.g., network address). The service redirector can also maintain data that indicates state of the I/O. For instance, the service redirector can update state data to indicate that the I/O has be submitted to a service instance.

At block 221, the service redirector receives output of a service instance. A service instance that receives a service request, can maintain a communication session with the requesting entity (e.g., the service redirector). As another example, the service redirector may transmit the service request to a service instance (219) using a remote procedure call or function call defined by an application programming interface. The output returns to the calling entity.

At block 223, the service redirector determines an I/O corresponding to the service instance output. The service redirector can have multiple outstanding service requests. The service redirector can assign identifiers to each of the service requests that are based on the I/O. As examples, a service request identifier can be a concatenation of a client address and a target of the I/O. The service request identifier can be a combination of the client address and a compact representation of the I/O data (e.g., a hash of the data to be written or the data being returned). Regardless of the particular identifier used, the service redirector can lookup an I/O in a structure that associates the I/O (e.g., storage request identifier) with the service request identifier. The service instance output may include the storage request to avoid maintaining state data.

At block 225, the service redirector updates I/O in accordance with the service instance output and forwards the updated I/O. For example, the service redirector can determine an input request associated with a service request that requested compression of data being written into the storage domain. The service redirector can modify the input request to replace the data from a client with the compressed data from the service instance. For data being ingested into the storage system, the service director can indicate a counterpart service, as discussed with respect to block 204, when an output is received from a service that has a counterpart service. As mentioned with respect to block 204, the redirector can indicate the counterpart service in metadata to be written into storage with the data from the service instance and/or indicate the counterpart service in metadata that is separate from the data being written into the storage system but that is associated with the data being written into the storage system. The redirector can determine the counterpart service in association with receiving the service instance output or earlier, for example in association with determining the ingest service. As another example, the service redirector can modify an output response to replace compressed data from the storage domain with decompressed data from the service instance. In addition, the service redirector can remove an indication of a counterpart service from retrieved data of a storage output response prior to supplying to a counterpart service instance or after receiving output from a counterpart service instance. If the service instance operates upon the storage I/O, then the storage redirector can examine the service instance output to determine whether it is a storage input request or a storage output response, and then forward the service instance output accordingly. Thus, the storage redirector can avoid maintaining state data for service requests.

Figure 3:
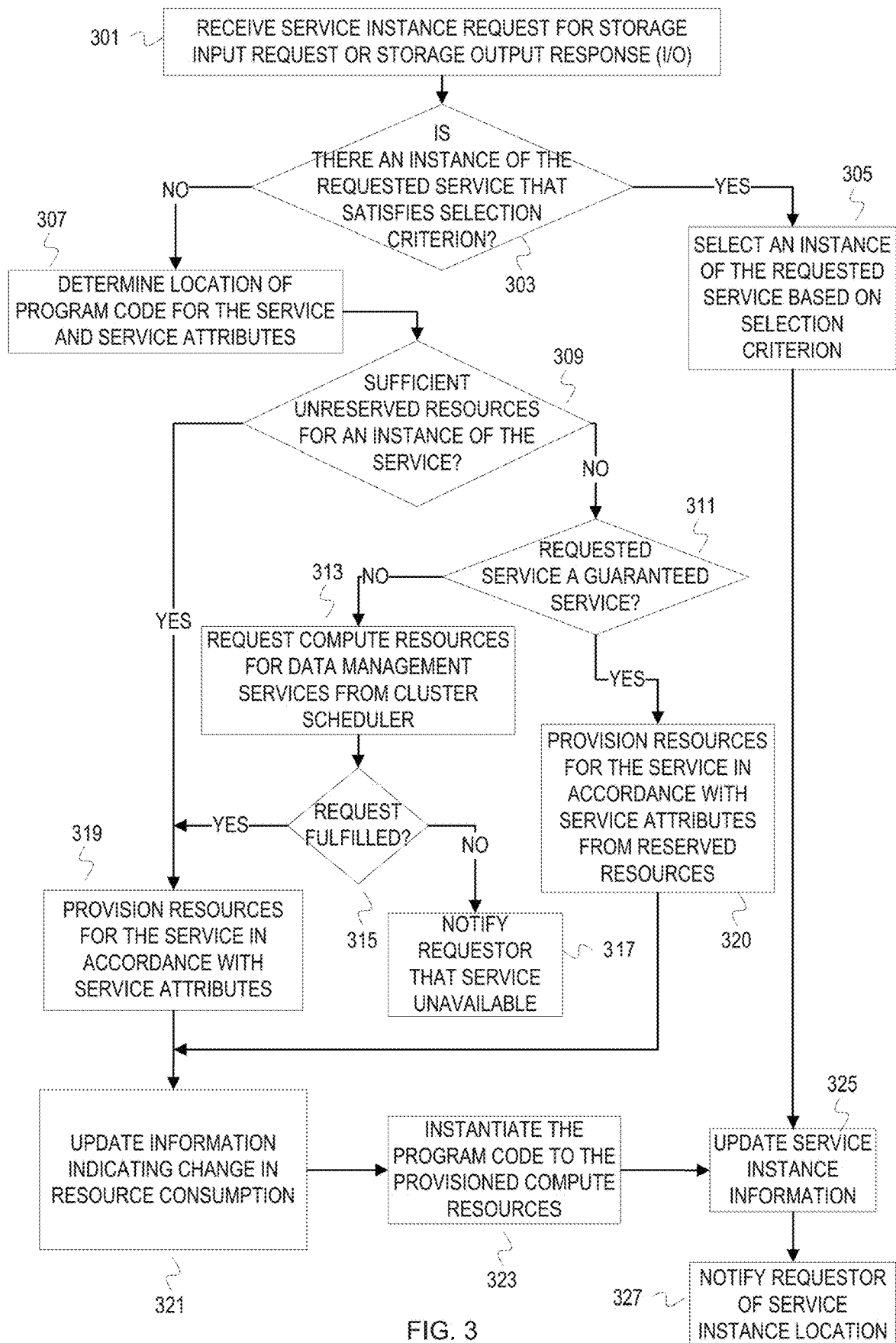
FIG. 3 is a flowchart of example operations for service a data management service request from a storage domain.

FIG. 3 is a flowchart of example operations for processing a data management service request from a storage domain. The remaining flowchart figures are described as if performed by a services engine. This shortened name is chosen instead of "data management services architecture manager" for ease of reading. The operations refer to the services engine because functionality can be organized/decomposed differently depending on developer, programming language, platform, customer requirements, etc. Therefore, the specific examples are provided to aid in understanding the disclosure without obfuscating the disclosure, and the specifics are not to be used to limit scope of the claims.

At block 301, a services engine receives a service instance request for a storage input request or a storage output response. Again, "I/O" is used to refer to either the storage input request or the storage output response. A service redirector in the storage domain transmitted the service instance request to the published service point as described in FIG. 2.

At block 303, the services engine determines whether there is an instance of the requested service that satisfies a criterion for selecting a service instance. The criterion corresponds to capacity of a service instance to provide a service. The services engine accesses service instance information that indicates location, capacity, and state of instantiated services. The services engine previously determined/derived the capacity information from service attributes and a resource consumption profile input into the services architecture. For instance, a configuration file or input via a user interface specifies an acceptable range of memory, type of memory (e.g., non-volatile memory for a stateful data management service), range of processing resources (e.g., processing speed, processor cycles, number of processing cores, etc.) for a specified data management service. In addition, this specified information can indicate the number of service requests that can be handled within different sub-ranges and combinations of resources provisioned for a data management service. The services engine could derive capacity with calculations based on the specified information. For instance, the services engine could calculate that an instantiated service can handle three times the specified requests for a particular resource provisioning if twice as many resources are actually provisioned. Service instance selection is not limited to identifying a service instance with sufficient capacity. When multiple instances of a service have sufficient capacity for processing data, one of the instances can be selected as a "best" instance. What qualifies as a "best" instance can be based on parameters configured in the services engine, parameters defined as selection criteria, parameters indicated in metadata associated with the I/O that is provided to the services engine from the redirector, criteria defined in a service policy, etc. For example, the services engine can be configured/programmed to compare capacity values of available service instances and select the service instance with the most capacity. As another example, a service policy and/or I/O metadata can indicate a quality of service (QoS) level. Based on the QoS level, the services engine selects a service instance provisioned with the most memory, fastest storage device, and most processing cores. If there is an instance of the requested service with sufficient capacity to handle the I/O, then control flows to block 305. If there is either no instance of the service or instances of the service have no available capacity for another I/O, then control flows to block 307.

At block 305, the services engine selects an instance of the requested service. The services engine selects the service instance with sufficient capacity. If multiple service instances have sufficient capacity, then the services engine can select the service instance with the greatest capacity. However, the services engine may select a service instance with sufficient capacity but the least capacity of the service instances having sufficient capacity. This may be done to allow for more rapid release of resources if requested. Service requests will be concentrated in already working service instances and increase the probability of idle service instances that can be terminated rapidly. In addition, the services engine can select a best service instance as described previously.

If the services engine determined that there was no instance of the requested service with available capacity at block 303, then the services engine determines location of program code for the requested service at block 307. The services engine accesses data that indicates location of the program code and service attributes ("service map"). Examples of service attributes include the resource consumption profile, user friendly name of the service (e.g., string), identifier for the service assigned by the services engine, and whether the service is stateful or stateless.

At block 309, the services engine determines whether sufficient unreserved resources are available for an instance of the requested service. The services engine determines whether unreserved resources that have been allocated to the data management services architecture from the compute pool (e.g., server farm or computer cluster) are sufficient to instantiate the requested service according to the resource consumption profile of the requested service, which was indicated in the service map. Although there may be unused resources allocated to data management services, those resources may be reserved for guaranteed data management services. If there are sufficient unreserved resources, then control flows to block 319. If there are not sufficient unreserved resources to instantiate the requested service, then control flows to block 311.

At block 311, the services engine determines whether the requested service is a guaranteed service. In some cases, the data management services architecture may guarantee availability of services, such as counterpart services as previously mentioned. The services engine can maintain a list of identifiers of the guaranteed services and compare the service identifier of the service request to the list of guaranteed service identifiers. A service need not be a counterpart service to be a guaranteed service. A service policy can designate a service as a guaranteed service. If the requested service is a guaranteed service, then control flows to block 320. If the requested service is not a guaranteed service, then control flows to block 313.

At block 320, the services engine provisions resources, from the reserved resources, for the requested service in accordance with the service attributes of the requested service. The service attributes indicate a resource consumption profile and may also indicate parameters for instantiating a service (e.g., compression ratio, specific watermark, etc.). To provision resources, the services engine determines one or more resource identifiers corresponding to the resources and marks those as provisioned. Control flows from block 320 to block 319.

If the requested service was not guaranteed and unreserved resources were insufficient, then control flowed to block 313. At block 313, the services engine requests compute resources for data management services from a cluster scheduler. The services engine can request the resources according to the resource consumption profile of the requested service or additional resources in anticipation of additional services.

At block 315, the services engine determines whether the request for resources has been fulfilled. If the cluster scheduler fulfills the request, then control flows to block 319. If the cluster scheduler does not fulfill the request, then control flows to block 317.

At block 317, the services engine returns the storage I/O to the service redirector or to a destination specified by the service redirector in the service request. The services engine can also maintain a log of each service request that could not be fulfilled due to insufficient resources.

If unreserved resources were sufficient (309) or subsequent obtained from the compute domain (315), then control flowed to block 319. At block 319, the services engine provisions resources for the requested service in accordance with the service attributes of the requested service. The service attributes indicate a resource consumption profile and may also indicate parameters for instantiating a service. To provision resources, the services engine determines one or more resource identifiers corresponding to the resources and marks those as provisioned.

After provision resources for the requested service, the services engine updates information indicating the change in resource consumption at block 321. The services engine updates the resource consumption information to indicate resources consumed for the requested service. If additional resources were allocated from the compute domain or if resources were used from the reserved resources, the services engine also updates the resource consumption information accordingly.

At block 323, the services engine obtains and instantiates the program code to the provisioned compute resources. The services engine determined location of the program code at block 307 from the service map. The services engine obtains that program code, installs the program code at a location identified by the resource identifier of the provisioned resources, and runs the program code. The services engine may supply the program code to the location identified by the resource identifier with a command to run the program code with the parameters determined from the service attributes.

At block 325, the services engine updates the service instance information. If the service instance was already available, then the services engine reduces the indication of capacity to account for use of the service instance for the I/O. If the service instance was instantiated (323), then the services engine installs a new entry in the service instance information that identifies the service, location of the service instance, capacity of the service instance, and status. Updating capacity can be deferred until the service instance receives the service request from the requestor. The service instance can then reduce the capacity information or notify another process to do so.

At block 327, the services engine provides dispatches a service request to the service instance. To dispatch a service request to a service instance, services engine provides access information (e.g., via a network message) to the service requestor (a service redirector in this example). Whether the requested service was instantiated at block 323 or a service instance was already available, the services engine determines the access information from the service instance information. The access information can include a network address and port identifier. Although this example returns access information to a service redirector for the service redirector to request a service of the service instance, the services engine can also mediate or handle service requests. Instead of returning the access information to the service redirector, the service redirector can convey an I/O (e.g., wrapping an input request in a service request, creating a service request with the I/O data and a service identifier, etc.) to the services engine. The services engine can then interact with an appropriate service instance to dispatch the service request to the service instance.

Figure 4:
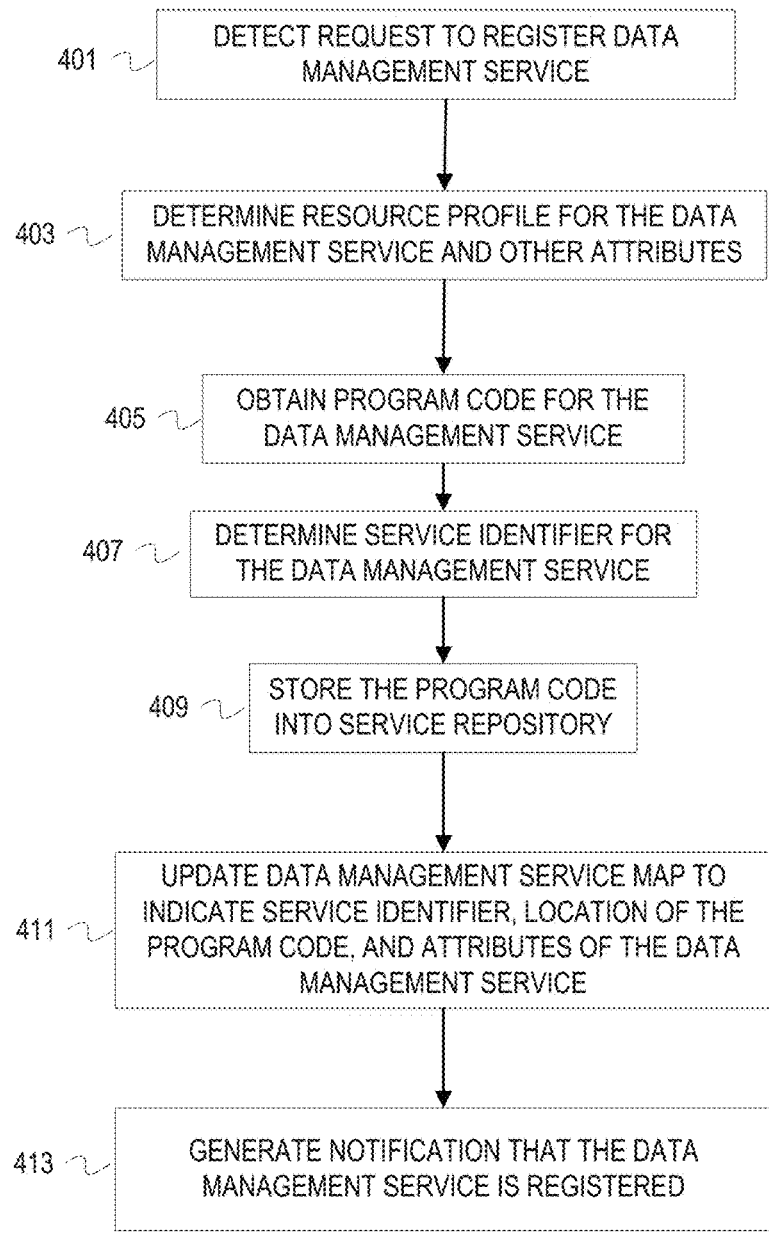
FIG. 4 is a flowchart of example operations for registering a service with the services architecture.
Figure 5:
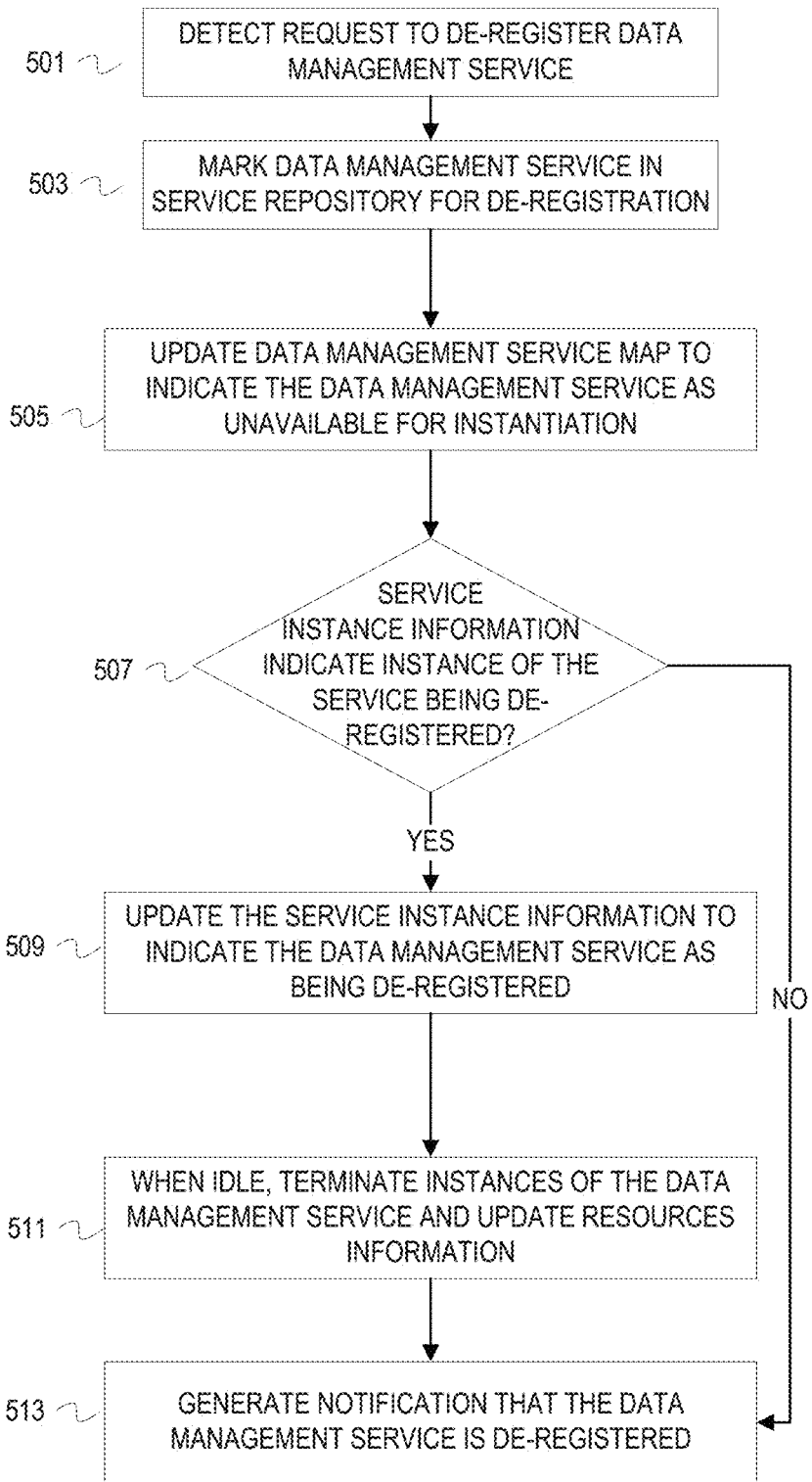
FIG. 5 is a flowchart of example operations for de-registering a service with the services architecture.

The preceding examples describe deployment of services in the services architecture. The program code for the available services is registered beforehand, and can be de-registered. FIGS. 4 and 5 are flowcharts of example operations for registering and de-registering data management services. Both Figures refers to the operations as being performed by a services manager for consistency with the preceding figures.

FIG. 4 is a flowchart of example operations for registering a service with the services architecture. At block 401 of FIG. 4, a services engine detects a request to register a data management service. As examples, the services engine can detect the request as input via a user interface, a request message, or as data read from a configuration file. The request indicates the data management service with any one or more of location information for the program code that implements the service, an owner established identifier for the program code, and a name of the service.

At block 403, the services engine determines a resource consumption profile for the data management service and other attributes. The request or subsequent input/information indicates attributes of the data management service. As previously described, the attributes include a resource consumption profile and can include parameters for the program code.

At block 405, the services engine obtains the program code for the data management service. The services engine can retrieves the program code in accordance with the request or subsequent information identifying location of the program code.

At block 407, the services engine determines a service identifier for the data management service. The services engine can derive the service identifier from an already established identifier of the program code. The services engine can generate an identifier for the data management service that is unique within the services architecture.

At block 409, the services engine stores the program code into a service repository. The service repository can be in the storage domain of the environment that includes the storage domain and a compute domain from which resources are allocated. The service repository contains the program code for data management services offered by the data management services architecture. The program code is stored in association with the service identifier for later retrieval of the program code.

At block 411, the services engine updates a data management service map to indicate the registered data management service. The services engine updates the service map to indicate the service identifier and attributes of the data management service. The services engine may also update the service map with location of the program code if the service identifier alone is not sufficient to retrieve the corresponding program code.

At block 413, the services engine generates a notification that the service is registered. This notification can be supplied to the storage domain. For example, the services engine can multicast the service identifier for the registered data management service to storage front end devices that are authorized to access the data management services.

De-registering a data management service accounts for existing instantiations of the data management service. FIG. 5 is a flowchart of example operations for de-registering a service with the services architecture.

At block 501, a services engine detects a request to de-register a data management service. The services engine can detect the request from a user interface, a configuration file, a message, etc. If the request does not identify the service with the service identifier known within the services architecture, then the services engine resolves the indication of the service as provided in the request to the service identifier known in the service architecture. A request for de-registering a service can be carried out in accordance with a default time period for completion, or can specify a time period for completion (e.g., immediate, within a day, etc.).

At block 503, the services engine marks the data manager service program code in the service repository for de-registering. Marking the program code as de-registered in the service repository prevents instantiating of the program code.

At block 505, the services engine updates the data service management map to indicate the data management service as unavailable for instantiation. Indicating a service as de-registered in the service map allows for an earlier determination that a service is de-registered than when the program code is being retrieved from the service repository.

At block 507, the services engine determines whether service instance information indicates that at least one instance of the service is already exists. The services engine can traverse the service instance information and determine where each instance of the service is running and whether the service instance is idle. If the service is not currently deployed according to the service instance information, then control flows to block 513. If the services engine determines that the service is deployed, then control flows to block 509.

At block 509, the services engine updates the service instance information to indicate that the service is being de-registered. This prevents dispatch of any service requests to instances of the service being de-registered. The services engine can set a flag, bit, etc. to prevent dispatch or reduce the capacity to zero. The services engine can also set the capacity information to null or a reserved value that represents de-registering of the service.

At block 511, the services engine monitors the instance(s) of the service until detecting an idle state. The services engine can detect an idle state for a service instance by detecting full available capacity or receiving a notification from a services monitor. The services engine can also periodically poll the instance(s) to determine whether the service instance is processing I/O. When the services engine detects that a service instance is idle, the services engine terminates the service instance. After termination, the services engine updates resource consumption information to indicate release of the resources previously consumed by the terminated service instance(s).

At block 513, the services engine generates a notification that the service is de-registered. This notification can be supplied to the storage domain, a user interface, a log, etc. For example, the services engine can multicast the service identifier for the de-registered data management service to storage front end devices that are authorized to access the data management services. The multicast message includes a field that indicates the identified service has been de-registered.

Variations

The example illustrations only refer to a single service instance being applied to data of a storage input request or a storage output response. Embodiments, however, can indicate a sequence of services. A service policy may evaluate to indicate multiple data management services for storage I/O. For service sequences, the service redirector indicates an order of application of the services to the storage I/O in the service request. When the services engine detects multiple services in a service request, the services engine can maintain state information to track service results through the indicated sequence. The services engine can also identify an internal destination for results prior to the final service in the sequence. Embodiments can also place the responsibility of tracking progress through a service sequence on the service redirector. As service results are returned to the service redirector, the service redirector generates new service requests with the preceding results until the service sequence is complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, additional operations can be performed in FIG. 2 to track service requests submitted to the services architecture. The storage front end device likely already tracks each request and response that traverses the storage front end device. Service redirector program code can include instructions to add information that indicates the request or response is in-flight in the services architecture. Referring to FIG. 3, additional operations can be performed to determine whether additional resources can be requested from the compute domain. Program code for a service manager can include instructions that determine whether requesting additional resources will violate a policy that restricts resource consumption ("consumption rules") by data management services. In addition, program code can also include instructions to replenish reserved resources when used for a guaranteed service. Moreover, additional operations can be performed in FIG. 3 to determine whether program code has been marked for de-registering before instantiating the program code at block 323. Referring to FIG. 5, updating information maintained by a services engine to indicate a service is being de-registered can vary based on priority. For example, the example flowchart marks the service for de-registering in the service repository, then the service map, and then the service instance information. This order assumes a prioritization of preventing service deployment quickly by marking the latest point in the service deployment process. This can be done in reverse order with a paradigm that allows for deployments already past the store map to proceed and stopping subsequent deployments. In addition, de-registering can mark a service for de-registering in few locations. Furthermore, the example of sending a message to the storage domain to indicate de-registering of a service can be done in response to receiving the request to de-register the service instead of after the service has been de-registered. This can avoid denial of service requests while the service is being de-registered.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The examples often refer to architectural components including an "engine" and a "manager." These constructs are used to generally refer to implementation of functionality for various operations in a data management services architecture. These constructs are utilized since numerous implementations are possible. An engine or a manager may be a program, application, thread, process, implemented on a particular component or components of a machine (e.g., a particular circuit card enclosed in a housing with other circuit cards/boards), implemented in a machine-executable program or programs, firmware, etc. The terms are used to efficiently explain content of the disclosure. Although the examples refer to operations being performed by an engine or a manager, different entities can perform different operations and be labeled with different names without substantially deviating from the disclosure.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
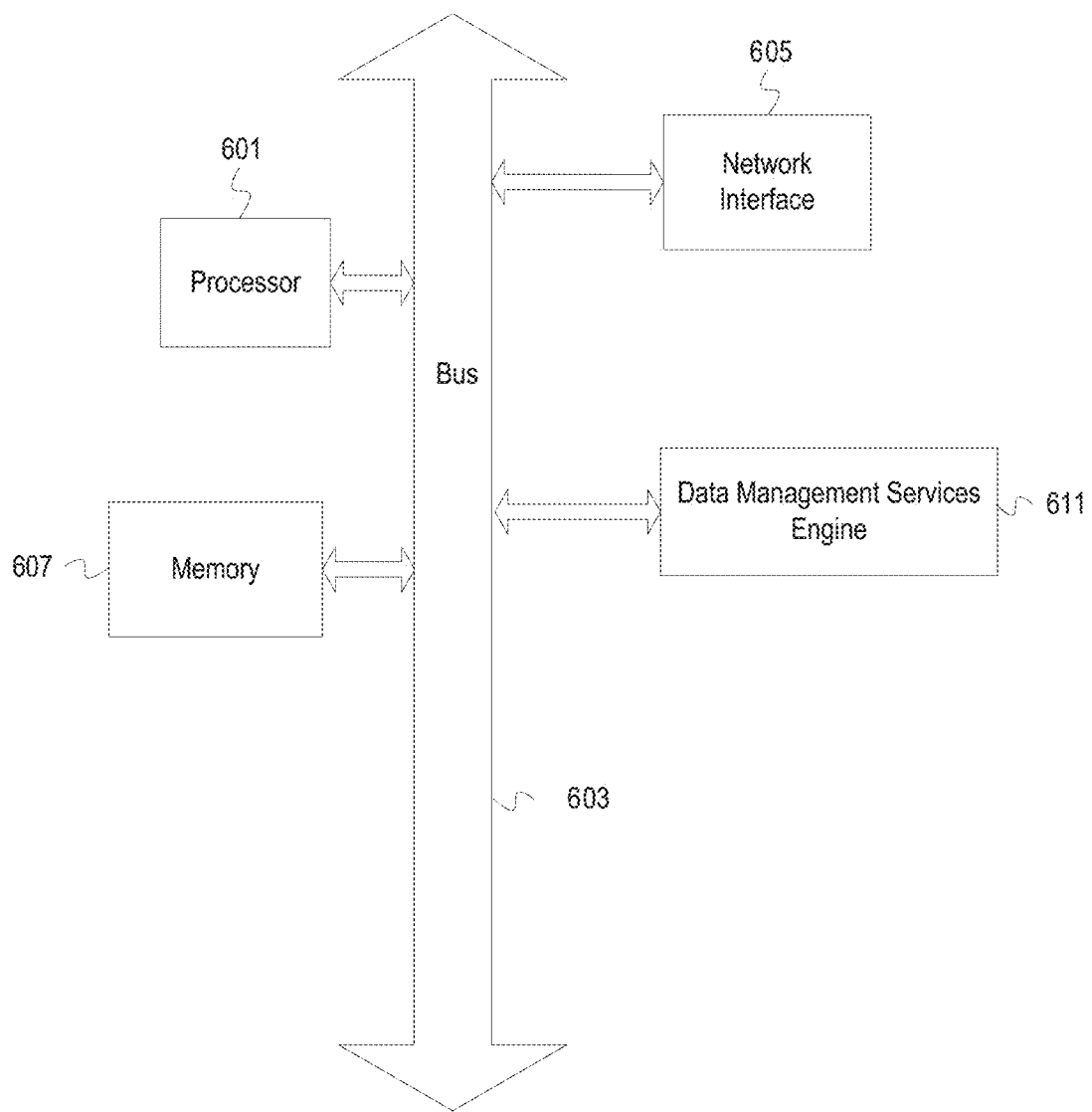
FIG. 6 depicts an example computer system with a data management services engine.

FIG. 6 depicts an example computer system with a data management services engine. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, Hyper-Transport® bus, InfiniBand® bus, NuBus, etc.) and a network interface 605 (e.g., a Fiber Channel interface, an Ethernet interface, an internet small computer system interface, SONET interface, wireless interface, etc.). The system communicates via transmissions to and/or from remote devices via the network interface 605 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes a data management services engine 611. The services engine 611 performs the various functionalities described above that include obtaining resources from a compute domain, provisioning obtained resources for providing services to a storage domain. The services engine 611 operates outside of the storage domain, while possibly using some of the resources of the storage domain. The services engine 611 can extend services beyond capabilities of the storage domain by leveraging resources of the compute domain and isolate various data management services. This isolation provides flexibility in choosing and implementing data management services free of fears of loss of control. The services engine 611 can scale resource consumption based on service demand, resource consumption policies of the compute domain, changing demands on the storage domain. Any one of the previously described functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for an adaptive, flexible architecture for providing extensible services to a storage domain as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
identifying a message type of an operation targeting a destination;
evaluating the message type against a set of message types that are not to be routed to data management services for processing before being routed to the destination;
in response to the to the message type occurring within the set of message types, routing the operation to the destination and refraining from redirecting the operation to the data management services for processing;
evaluating service state information populated with service identifiers, service instance locations, service instance capacities for processing operations, and statuses periodically updated using timestamps from service instances; and
in response to the message type not occurring within the set of message types, redirecting the operation to a service instance of a data management service identified by a service identifier as being instantiated at a service instance location and having a service instance capacity and status indicating that the service instance is capable of processing the operation, wherein service state information is used to track deployment of the data management service processing the operation.

2. The method of claim 1, comprising:
refraining from redirecting operations to the data management services based upon a transition to a state that suspends service availability.

3. The method of claim 1, comprising:
in response to determining that a plurality of data management services can process the operation, selecting the data management service to process the operation based upon the data management service satisfying a criterion for processing the operation.

4. The method of claim 3, wherein a service map and provisioned resources are used to determine the service instance capacities.

5. The method of claim 3, wherein the criterion corresponds to at least one of a quality of service level of the operation or a capacity of the data management service for processing the operation.

6. The method of claim 1, wherein the operation specifies the service identifier of the data management service, and the method comprising:

comparing the service identifier to a list of service identifiers of guaranteed services to determine whether the data management service is a guaranteed service, wherein resources are provisioned for the data management service from reserved resources in accordance with service attributes based upon the data management service being the guaranteed service.

7. The method of claim 1, wherein the operation specifies the service identifier of the data management service, and the method comprising:
comparing the service identifier to a list of service identifiers of guaranteed services to determine whether the data management service is a guaranteed service, wherein a request is submitted to a cluster scheduler for compute resources for the data management service based upon the data management service not being the guaranteed service.

8. The method of claim 1, comprising:
in response to redirecting the operation to the data management service, updating information indicating a change in consumption corresponding to resources being provisioned for the data management service to process the operation.

9. The method of claim 1, comprising:
in response to the data management service processing the operation to create a processed operation, routing the processed operation to the destination.

10. A non-transitory machine readable medium comprising instructions for performing a method, which when executed by a machine, causes the machine to:
identify a message type of an operation targeting a destination;
evaluate the message type against a set of message types that are not to be routed to data management services for processing before being routed to the destination;
in response to the to the message type occurring within the set of message types, route the operation to the destination and refraining from redirecting the operation to the data management services for processing;
evaluate service state information populated with service identifiers, service instance locations, service instance capacities for processing operations, and statuses periodically updated using timestamps from service instances; and
in response to the message type not occurring within the set of message types, redirect the operation to a service instance of a data management service identified by a service identifier as being instantiated at a service instance location and having a service instance capacity and status indicating that the service instance is capable of processing the operation, wherein service state information is used to track deployment of the data management service processing the operation.

11. The non-transitory machine readable medium of claim 10, wherein the instructions cause the machine to:
refrain from redirecting operations to the data management services based upon a transition to a state that suspends service availability.

12. The non-transitory machine readable medium of claim 10, wherein the instructions cause the machine to:
in response to determining that a plurality of data management services can process the operation, select the data management service to process the operation based upon the data management service satisfying a criterion for processing the operation.

13. The non-transitory machine readable medium of claim 12, wherein the criterion corresponds to a capacity of the data management service for processing the operation.

14. The non-transitory machine readable medium of claim 12, wherein the criterion corresponds to quality of service level of the operation.

15. The non-transitory machine readable medium of claim 10, wherein the operation specifies the service identifier of the data management service, and wherein the instructions cause the machine to:
compare the service identifier to a list of service identifiers of guaranteed services to determine whether the data management service is a guaranteed service, wherein resources are provisioned for the data management service from reserved resources in accordance with service attributes based upon the data management service being the guaranteed service.

16. A computing device comprising:
a memory comprising machine executable code for performing a method; and
a processor coupled to the memory, the processor configured to execute the machine executable code to cause the processor to:
identify a message type of an operation targeting a destination;
evaluate the message type against a set of message types that are not to be routed to data management services for processing before being routed to the destination;
in response to the to the message type occurring within the set of message types, route the operation to the destination and refraining from redirecting the operation to the data management services for processing;
evaluate service state information populated with service identifiers, service instance locations, service instance capacities for processing operations, and statuses periodically updated using timestamps from service instances; and
in response to the message type not occurring within the set of message types, redirect the operation to a service instance of a data management service identified by a service identifier as being instantiated at a service instance location and having a service instance capacity and status indicating that the service instance is capable of processing the operation, wherein service state information is used to track deployment of the data management service processing the operation.

17. The computing device of claim 16, wherein the machine executable code causes the processor to:
in response to redirecting the operation to the data management service, update information indicating a change in consumption corresponding to resources being provisioned for the data management service to process the operation.

18. The computing device of claim 16, wherein the machine executable code causes the processor to:
in response to the data management service processing the operation to create a processed operation, route the processed operation to the destination.

19. The computing device of claim 16, wherein the machine executable code causes the processor to:
in response to suspending service availability of the data management services, refrain from redirecting operations to the data management services.

20. The computing device of claim 16, wherein the machine executable code causes the processor to:
in response to determining that a plurality of data management services can process the operation, select the data management service to process the operation based upon the data management service satisfying a criterion for processing the operation.

\* \* \* \* \*